United States Patent [19]
Larsen et al.

[11] 4,384,246
[45] May 17, 1983

[54] SERIES-THYRISTOR SUBSYNCHRONOUS DAMPER FOR POWER GENERATORS

[75] Inventors: Einar V. Larsen, Wallingford, Pa.; Daniel H. Baker; Colin E. J. Bowler, both of Schenectady, N.Y.

[73] Assignee: General Electric Company, N.Y.

[21] Appl. No.: 229,791

[22] Filed: Jan. 30, 1981

[51] Int. Cl.³ .............................................. H02H 7/06
[52] U.S. Cl. ....................................... 322/58; 322/29; 322/100; 361/20
[58] Field of Search ..................... 322/19, 20, 21, 29, 322/58, 24, 90–95, 100; 361/112, 113, 20, 21

[56] References Cited

U.S. PATENT DOCUMENTS

| | | | |
|---|---|---|---|
| 3,813,593 | 5/1974 | Tice et al. | 322/58 X |
| 3,999,115 | 12/1976 | South et al. | 322/58 X |
| 4,242,628 | 12/1980 | Mohan et al. | 322/95 X |
| 4,311,253 | 1/1982 | Putman et al. | 322/100 X |
| 4,329,637 | 5/1982 | Kotake et al. | 322/58 X |

*Primary Examiner*—R. J. Hickey
*Attorney, Agent, or Firm*—Robert A. Cahill

[57] ABSTRACT

A voltage source is connected in series with the neutral secondary winding on a generator step-up transformer through an electrical reactance. A control circuit and a pair of thyristor banks are employed to apply the voltage source to the transformer winding to dampen sybsynchronous resonance currents and to prevent torsional mode vibrations from occurring within the generator.

10 Claims, 1 Drawing Figure

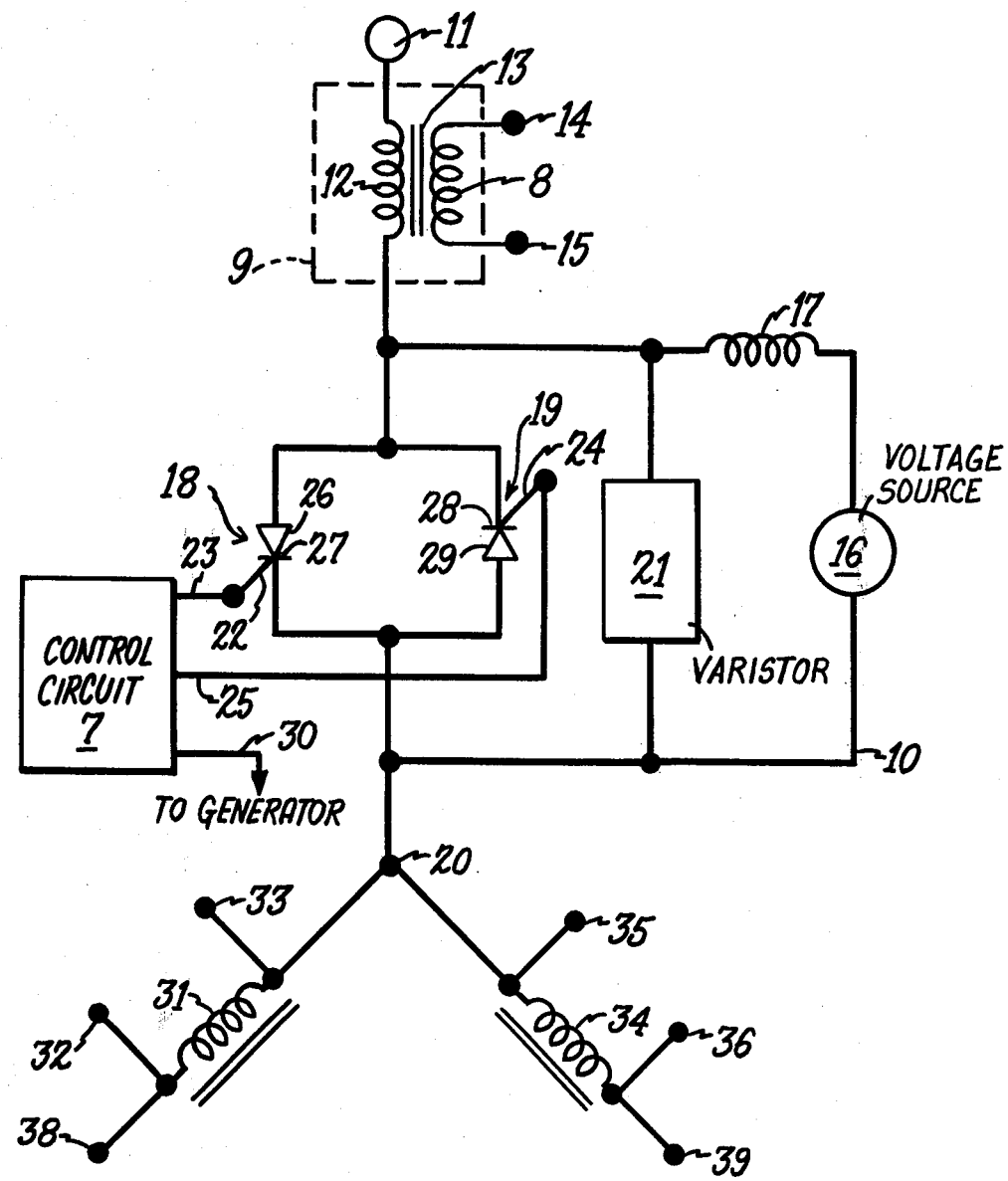

SERIES-THYRISTOR SUBSYNCHRONOUS DAMPER FOR POWER GENERATORS

BACKGROUND OF THE INVENTION

When series capacitors are used in an electric utility transmission system to reduce the reactive component of line impedance, an oscillatory electric circuit is created that has a natural electrical frequency in the subsynchronous frequency range, generally between 10 and 40 Hz, as contrasted to the power generating operating frequency of 60 Hz. Transient currents in the subsynchronous frequency range interact with the field excitation of the generator rotor of the power generating equipment to produce pulsating air-gap torques, at slip frequency, that is, between 30–50 Hz. The slip frequency air-gap torques produce rotor oscillations and corresponding torques on the shafts connecting the generator and turbine rotors of the power generating equipment. If the slip frequency torque happens to correspond closely to any of the mechanical torsional natural frequencies of the turbine generator assembly, the resulting rotor motions of the power generating equipment can become appreciable and the corresponding shaft torques that develop can be damaging and, as for example, may cause breakage of the shaft. Furthermore, the generator rotor motion produces a voltage in the armature circuit which reinforces the electrical system natural frequency currents so that they decay more slowly than they would for constant rotor speed. In the limit these coupled mechanical and electrical system oscillations reinforce each other to the point where they become unstable, in which case they will build up spontaneously to damaging levels without any large initiating system distrubance. This is the phenomena known as subsynchronous resonance (SSR).

It is highly desirable to maintain continuing operation of a power generating system, although such power generating system is subjected to widely varying conditions over a period of time. The varying conditions include fault currents, switching operations, varying loads and varying voltage-current phase relationships. In general, it has been found that long-distance power transmission systems, and the loads thereon, are inductive in nature and it is advantageous to compensate for this by introducing series capacitor compensating means into the power transmission system for the purpose of improving stability or voltage regulation or obtaining the desired current flow division.

U.S. Pat. No. 3,813,593 discloses a method for reducing turbine-generator shaft torques wherein a plural section power filter is serially connected in the power line of the power transmission system between a low voltage side of each winding and a common neutral in each leg of the Y secondary of the generator step-up transformer. The filter is tuned such that it offers a minimum impedance to current at the power frequency while presenting an impedance to current at subsynchronous frequencies in a ratio proportional to the amount of stress expected to be caused to the turbine generator connecting shaft by the interaction of subsynchronous frequency currents with the generator magnetic flux.

Another method currently employed for reducing turbine-generator shaft torque consists of connecting a transformer directly to the generator terminals, the secondary of which has connected a reactor and a pair of thyristors between each of the transformer secondary windings. A control circuit senses the occurrence of subsynchronous current and fires the thyristors to provide an opening current to dampen the sybsynchronous currents.

The devices employed in the combination of thyristors and reactor connected across each of the generator terminal phases requires a considerably higher mVA rating than the devices associated with the series-thyristor SSR damper, and the former is, therefore, more expensive than the latter.

The purpose of this invention is to provide a means for attenuating subsynchronous frequencies in a power transmission system utilizing an arrangement of circuit elements that are less costly than those of the prior art.

SUMMARY OF THE INVENTION

The invention comprises a damping circuit consisting of a reactor and a pair of thyristors in series with the neutral terminal of the secondary winding on a generator step-up transformer. A voltage source is employed to provide a damping current to the circuit to cancel any subsynchronous current flow to the generator. A generator shaft speed sensor and control circuit are employed to monitor the rotation of the generator shaft and to modulate the switching time of the thyristors upon the occurrence of oscillations caused by subsynchronous currents.

BRIEF DESCRIPTION OF THE DRAWINGS

The sole drawing FIGURE is a diagrammatic representation of the series-thyristor subsynchronous resonance damper circuit of the invention.

DESCRIPTION OF THE PREFERRED EMBODIMENT

The subsynchronous resonance damper circuit 10 of the invention is shown in the drawing wherein a first phase of a transmission line terminal 11 and a first phase secondary winding 12 of a generator step-up transformer 9 are shown. First phase secondary winding 12 is magnetically linked, by means of core 13, with a primary winding 8 having first and second primary terminals 14 and 15 which are connected with an electric power generator which is not shown. A voltage source 16 which can be obtained from a bus-fed transformer (not shown) or a tertiary winding (not shown) of step-up transformer 9, is connected between first phase secondary winding 12 and neutral terminal 20. A reactor 17 is electrically connected in series with voltage source 16 and a first thyristor 18. First thyristor 18 and a second thyristor 19 are electrically connected back to back across voltage source 16 in order to control the time period when current provided by voltage source 16 is fed through first phase step-up transformer 9 back to the voltage generator. Zinc oxide varistor 21 is electrically connected across first and second thyristors 18, 19 in order to protect the thyristors from voltages in excess of their rating. Reactor 17 prevents excess current from damaging voltage source 16 when thyristors 18, 19 are energized to effectively provide a short circuit within circuit 10. The primary function of circuit 10 is to provide out-of-phase current back to the generator upon the occurrence of subsynchronous resonance current from the transmission line. The magnitude of the out-of-phase currents from voltage source 16 is adjusted in proportion to the magnitude of the subsynchronous resonance current flowing in the transmission lines in the following manner. A control circuit 7, connected to gate 22 of first thyristor 18 by means of lead 23 and to gate 24 of second thyristor 19 by means of lead 25, provides signals to gates 22 and 24 to cause thyristors 18 and 19 to fire upon command. Anode 26 of first thyristor 18 is electrically connected with reactor 17 and secondary winding 12. Cathode 28 of second thyristor 19 is electrically connected with reactor 17 and secondary winding 12 in order to provide current flow in both directions through circuit 10. Cathode 27 of first thyristor 18 and anode 29 of second thyristor 19 are connected with one side of voltage source 16. Leads 23 and 25 connecting with control circuit 7 provide the control signals for first and second thyristors 18 and 19. Lead 30 connecting with control circuit 7 receives a signal from the generator by means of a toothed wheel and magnetic pickup that produce frequency modulation in proportion to the torsional oscillation of the generator shaft. The use of a toothed wheel and magnetic pickup such as described in U.S. Pat. No. 4,148,222 is well known in the electrical voltage generator industry and will not be described in detail. For purposes of this disclosure it is sufficient to connect lead 30 from control circuit 7 for receiving an electrical signal which varies in proportion to the torsional oscillation of the generator shaft in order to determine the presence and magnitude of subsynchronous resonance oscillation occurring at the generator shaft. Control circuit 7 contains logic circuit elements such as a microprocessor programmed to respond to variations in the signal received on lead 30.

Circuit 10 is connected in one phase of a three-phase transformer arrangement having two other secondary windings such as 31 and 34. Neutral terminal 20 connects with the other secondary windings 31, 34 and both secondary windings 31, 34 are connected to the transmission line by means of terminals 38 and 39, respectively. Terminals 32 and 33 of secondary winding 31 are connected back to the voltage generator. Terminals 35 and 36 of secondary winding 34 also connect back to the voltage generator. Although not shown, for purposes of simplification, a subsynchronous resonance damper circuit similar to 10 is also connected in series between secondary winding 31 and neutral terminal 20 as well as between secondary winding 34 and neutral terminal 20 for the purpose of damping any subsynchronous currents originating in any of the other phases.

What we claim as new and desire to secure by Letters Patent of the United States is:

1. In a system comprising a voltage generator having a step-up transformer, a circuit for damping subsynchronous resonance oscillations occurring in voltage generators comprising:
   a pair of thyristors connected in series with one of the windings of a step-up transformer connected with a voltage generator;
   an electrical reactor connected in series with a voltage source and with said thyristors for supplying electrical current to said transformer to cancel any subsynchronous resonance current flow to said voltage generator.

2. The circuit of claim 1 wherein said transformer represents one phase of a three-phase connected generator and wherein corresponding pairs of thyristors are connected within each of the other phases of said three-phase generator.

3. The circuit of claim 1 further including a varistor element connecting across said thyristors in order to protect said thyristors from overvoltage conditions.

4. The circuit of claim 1 wherein a cathode of each of said thyristors is connected with an anode of the other of said thryristors.

5. The circuit of claim 1 further including a control circuit for triggering said thyristors upon the occurrence of said subsynchronous resonance current.

6. The circuit of claim 5 wherein said control circuit is connected to a gate of each of said thyristors to provide a signal at said gate upon the occurrence of said sybsynchronous resonance current.

7. The circuit of claim 1 wherein said voltage comprises a tertiary winding on said voltage generator step-up transformer.

8. The circuit of claim 1 wherein said pair of thyristors is connected between a secondary winding of said voltage generator step-up transformer and a neutral terminal of said step-up transformer.

9. The circuit of claim 1 wherein the primary windings of one phase of said voltage generator step-up transformer are connected with one phase of said voltage generator.

10. The circuit of claim 5 wherein said control circuit includes a microprocessor.

* * * * *